(12) United States Patent
Cathey et al.

(10) Patent No.: US 6,735,456 B2
(45) Date of Patent: *May 11, 2004

(54) POWER-SAVING MODE FOR PORTABLE COMMUNICATION DEVICES

(75) Inventors: David A. Cathey, Boise, ID (US); Kip A. Bedard, Boise, ID (US); David A. Zimlich, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/307,140

(22) Filed: Nov. 27, 2002

(65) Prior Publication Data

US 2003/0087682 A1 May 8, 2003

Related U.S. Application Data

(63) Continuation of application No. 09/758,838, filed on Jan. 10, 2001, now Pat. No. 6,532,375, which is a continuation of application No. 09/066,616, filed on Apr. 24, 1998, now Pat. No. 6,201,977.

(51) Int. Cl.[7] .............................. H04M 1/00; H04B 1/16
(52) U.S. Cl. ........................ 455/574; 455/556; 455/343
(58) Field of Search ................................. 455/574, 556, 455/343, 572, 84, 115, 127, 54; 327/74, 143

(56) References Cited

U.S. PATENT DOCUMENTS

| 4,259,594 A | 3/1981 | Fox et al. |
| H610 H | 3/1989 | Focarile et al. |
| 5,117,449 A | 5/1992 | Metroka et al. |
| 5,148,473 A | 9/1992 | Freeland et al. |
| 5,438,701 A | 8/1995 | Yamada et al. |
| 5,497,112 A | 3/1996 | Hoang |
| 5,526,398 A | 6/1996 | Okada et al. |
| 5,701,337 A | 12/1997 | Silver et al. |
| 5,802,470 A | 9/1998 | Gaulke et al. |
| 5,854,984 A | 12/1998 | Buhrmann et al. |
| 6,009,309 A | 12/1999 | Okada et al. |
| 6,085,325 A | 7/2000 | Jackson et al. |
| 6,201,977 B1 * | 3/2001 | Cathey et al. ............. 455/574 |
| 6,205,331 B1 | 3/2001 | Jeon |
| 6,532,375 B2 * | 3/2003 | Cathey et al. ............. 455/574 |
| 6,603,223 B2 * | 8/2003 | Utsunomiya ............... 307/154 |
| 2001/0039195 A1 | 11/2001 | Nickum |

FOREIGN PATENT DOCUMENTS

WO  WO 91/14332 A1  9/1991

OTHER PUBLICATIONS

Maxim Ultra Low–Power, Single/Dual Supply Comparators Spec.
IEEE Journal: Programmable CMOS Dual Channel Interface.

* cited by examiner

Primary Examiner—Charles Appiah
(74) Attorney, Agent, or Firm—TraskBritt

(57) ABSTRACT

Apparatus for ensuring that, in a portable, battery-powered communication package incorporating at least two communication devices, such as a combination cellular telephone and a pager, sufficient power is provided for extended operation of the communication device having the lowest continuous power consumption requirements when the device having a higher continuous power consumption rate has consumed a selected portion of the total power initially available to the combined devices.

20 Claims, 5 Drawing Sheets

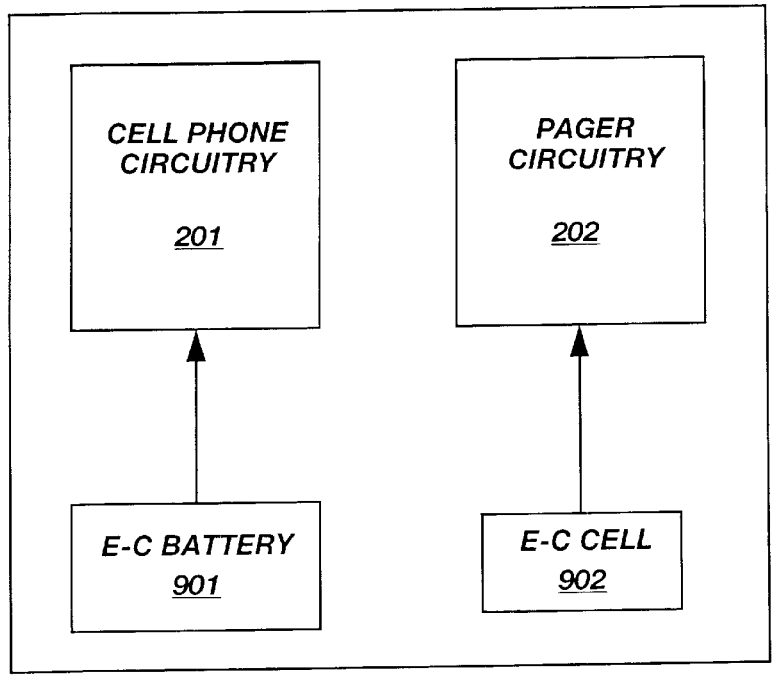

*Fig. 9*

Steps for a method for ensuring that in a portable communication system having at least two communication devices 201, 202 packaged as a single unit, sufficient power is provided for extended operation of the communication device having the lowest continuous power consumption requirement:

1. First, providing a communication system incorporating at least first 201 and second 202 communication devices in a single package, the first 201 device having a higher continuous power consumption rate than the second 202 device;

2. Next, after the first step, providing an exhaustible supply 204 of direct-current power within the package for the system, said exhaustible supply 204 having a finite amount of available power; and 3. Then, after the second step, dedicating a selected portion of the available direct-current power within the package to the second 202 communication device so that it may remain serviceable for a desired period, in spite of the higher power consumption requirements of the first 201 communication device.

*Fig. 10*

POWER-SAVING MODE FOR PORTABLE COMMUNICATION DEVICES

CROSS-REFERENCE TO RELATED APPLICATIONS

This application is a continuation of application Ser. No. 09/758,838, filed Jan. 10, 2001, now U.S. Pat. No. 6,532,375, issued Mar. 11, 2003, which is a continuation of application Ser. No. 09/066,616, filed Apr. 24, 1998, now U.S. Pat. No. 6,201,977, issued Mar. 13, 2001.

BACKGROUND OF THE INVENTION

1. Field of the Invention

This invention relates to portable, battery-powered communication devices such as cellular telephones and pagers. More particularly, it relates to a portable communication device incorporating both a cellular telephone and a pager. It also relates to methods and devices for extending battery life during operation of such devices.

2. State of the Art

During the past two decades, rapid proliferation of portable communication devices has been nothing short of amazing. During the past 15 years, cellular telephones have progressed from being a novelty to a ubiquitous appliance. The use of pager devices has also become widespread.

The following equipment examples are illustrative of the current state of this burgeoning industry. In the latter half of 1996, Nokia, a manufacturer of communications equipment, announced the introduction of the Nokia 9000 Communicator, a portable communication system that combines digital, voice and data services, as well as personal organizer functions in a single, compact unit. The Nokia device incorporates processing capability provided by an Intel 24 MHz 386 microprocessor, flash memory, and a powerful, memory-efficient graphical user interface (GUI) operating system named GEOS developed by Geoworks, Inc. The Nokia communication system is designed to work in combination with a hand-held computer screen produced by Reflection Technology, Inc., a manufacturer of virtual display technology and wireless messaging equipment. The computer screen, which displays a full 12-inch page of graphics and text, connects with cellular or land phone lines to allow a mobile user to receive, read, store and send faxes without the use of a laptop computer. The device features a virtual keyboard with which the user may create memos and respond to faxes, and a full-screen menu that allows users to choose certain functions, such as view, send, enlarge and reduce. The device can store approximately 25 pages and has a built-in directory that stores more than 100 names and fax numbers for use with the unit's auto-dial feature.

In the case of a portable combination electronic device, one of the constituent devices typically consumes more power than the other during operation. A combination portable communication device incorporating both a cellular telephone and a pager is one such combination device. Power consumption of the cellular phone, particularly in the transceive mode, is typically several orders of magnitude greater than that of a pager device. For example, a typical cellular telephone with a 400 mAh nickel-cadmium battery will operate in the transmit-receive mode for only about 70 minutes before the battery must be charged or replaced. Standby time for the same battery is about 17 hours. Most of the power consumed during standby mode is required to operate the periodic query function which maintains cellular phone orientation with respect to the cellular grid. Pagers, on the other hand, require far less power to operate because they are, in the most basic mode of operation, merely radio receivers. Thus, they are generally endowed with much greater battery life. A standard beeper powered by a single AA-size alkaline power cell will operate continuously for four to six weeks if only the beeper notification mode is employed. Operating the same pager in the vibrator notification mode can halve battery life.

When a pager device and a cellular phone are combined into a single unit having a single battery power supply, maximum useful operating life of the pager between battery charges is largely dictated by battery life of the cellular telephone operating in standby mode. When the transmit-receive mode is employed, operating life of the pager on a single charge can be cut dramatically. This is particularly true where the user has little control over the number of incoming calls. Thus, even though the pager function may be more critical to the user, the pager function may be rendered useless by incoming telephone calls which drain the battery to the point where both the pager function and the telephone function are inoperative due to battery discharge below the critical operating voltage.

FIG. 1 depicts a circuit which has heretofore been utilized to control one of two or more electronic devices powered by a single depletable power supply where the device to be controlled requires a clock signal input for operation. A precision reference voltage VR is supplied to the inverting terminal (i.e., the "−" terminal) of comparator 102, and a sample voltage VS (taken from a voltage divider 101 constructed from resistors R1 and R2) is supplied to the non-inverting terminal (i.e., the "+" terminal) of comparator 102. The values of resistors R1 and R2 are selected so that the sample voltage VS is greater than VR, with the difference between VS and VR corresponding to the voltage range selected for continuous operation of an electronic device. The intermediate output VO1 from comparator 102 is fed to one of a pair of inputs to NAND gate 103. A clock signal CLK is fed to the other input. As long as VS is greater than VR, the current path through resistor R3 will maintain VO1 high, and an inverted clock signal CLK* will be passed through NAND gate 103. When VS drops below VR, comparator 102 will pull VO1 low. The signal CLK* is utilized to operate a second device. In order to prevent oscillations about the set turnoff point, hysteresis is provided at the output via a feedback path 104 through resistor R4.

BRIEF SUMMARY OF THE INVENTION

The invention includes a method and apparatus for ensuring that, in an electro-chemically powered system which incorporates at least two communication devices packaged in a single unit, such as a combination cellular telephone and pager, or a combination hand-held computer and pager, sufficient power is provided for extended operation of the communication device having the lowest continuous power consumption requirements when the device having a higher continuous power consumption rate has consumed a selected portion of the total power initially available to the combined devices. In the case of the aforestated first exemplary system (i.e., a combination cellular telephone and pager), cellular telephone function is disabled when a selected portion of the total power initially available is consumed. As a method of a first embodiment of the invention which may be implemented with multiple communication devices powered by a single battery in which voltage varies somewhat linearly as a function of charge level, operation of the high-power-consumption device is disabled when a preset battery charge level is reached. This preset voltage level is well above the critical operating voltage of the pager and corresponds to a battery discharge level that is still able to provide pager operation for an extended period. A second embodiment of the invention, in method form, involves providing a separate power supply for the low-power-consumption communication device for which operation for an extended period must be maintained. As an apparatus, in combination with a combination communication device, the first embodiment of the invention may include a headroom-limited flyback power supply which powers the high-power consumption device. When headroom drops below a minimum set by a series-coupled diode string, power is cut off to the high-power-consumption device. The first embodiment of the invention may alternatively include a battery charge sense circuit which produces a digital signal, the digital signal corresponding to either a battery charge state that is above the predetermined voltage level or a battery charge state that is below the predetermined voltage level. In one state, the produced digital signal maintains operability of the high-power-consumption device. In the other state, the digital signal disables the high-power-consumption device. For a preferred first embodiment apparatus, the invention may also include a visible or audible warning device that notifies the user of a low battery charge condition, as well as an emergency manual override switch with which power to the high-power-consumption device may be restored regardless of the battery charge state. A second embodiment apparatus includes multiple communication devices in a single portable package, a first power supply dedicated exclusively to one of the communication devices for which operation over an extended period is critical, and a second power supply dedicated to at least one other communication device within the single portable package.

BRIEF DESCRIPTION OF THE SEVERAL VIEWS OF THE DRAWINGS

FIG. 9 is a block schematic diagram of a second embodiment portable combination communication device incorporating the invention; and FIG. 10 lists the basic steps of the method for implementing the invention.

DETAILED DESCRIPTION OF THE INVENTION

Figure 1:
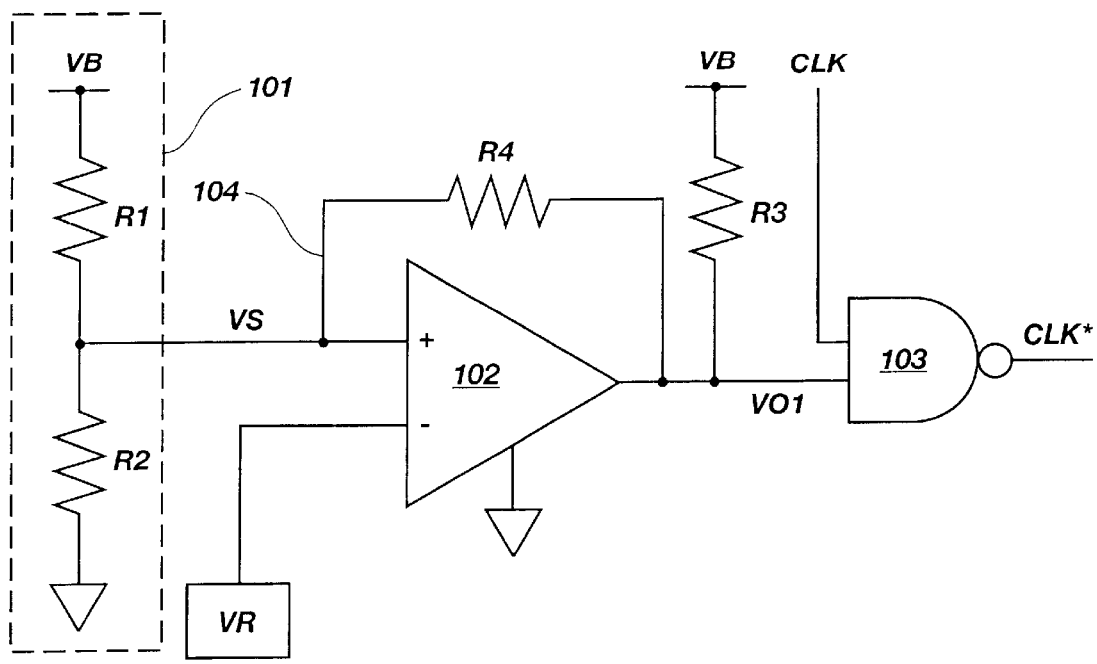
FIG. 1 is a prior art control circuit which uses a passed through clock signal to control one of two or more devices powered by a single depletable power supply.

The present invention will be described in terms of a combination communication system which includes a pager and a cellular telephone in a single portable package. Referring now to the block circuit diagram of FIG. 2, which depicts a first embodiment apparatus, a portable combination communication system includes dedicated cellular telephone circuitry 201, dedicated pager circuitry 202, shared circuitry 203 that is utilized by both the cellular telephone and pager functions, a single electrochemical battery 204, which provides power for system operation, and a power management unit 205, which monitors the charge level of battery 204 and cuts off the flow of electrical power from the battery 204 to the dedicated cellular telephone circuitry 201 when the measured voltage drops below a predetermined level that corresponds to a minimum battery charge level required for continued operation of the dedicated pager circuitry for a desired period of time. Generally, the desired period of time will be at least 24 hours, which will afford the user ample opportunity to return to his/her home or office and either recharge or replace the battery 204. The dedicated pager circuitry 202, the shared circuitry 203 and the power management unit 205 are coupled directly to the battery 204 via power bus 206. Power to the dedicated cellular telephone circuitry is also provided by the battery 204, but via electrical supply path 207, which is controlled by the power management unit 205. The portable communication system of FIG. 2 also optionally includes a low battery charge level warning device 208, which may be a visible or audible warning device that notifies the user of a low battery charge condition, as well as an emergency manual override switch 209 by means of which power to the dedicated cellular telephone circuitry (i.e., the circuitry corresponding to the high-power-consumption device) may be restored regardless of the battery charge state.

Figure 2:
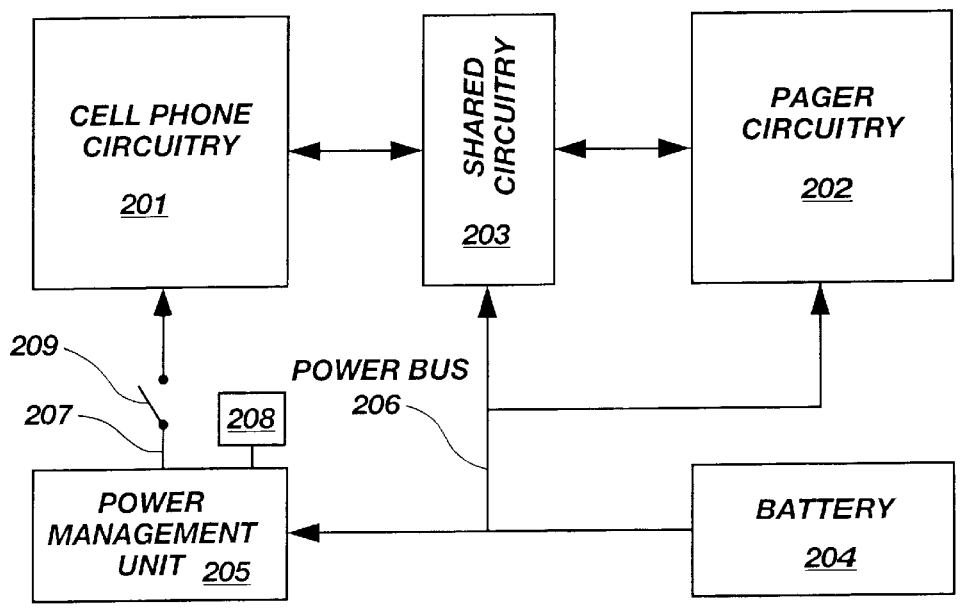
FIG. 2 is a block schematic diagram of a first embodiment portable combination communication device incorporating the invention.
Figure 3:
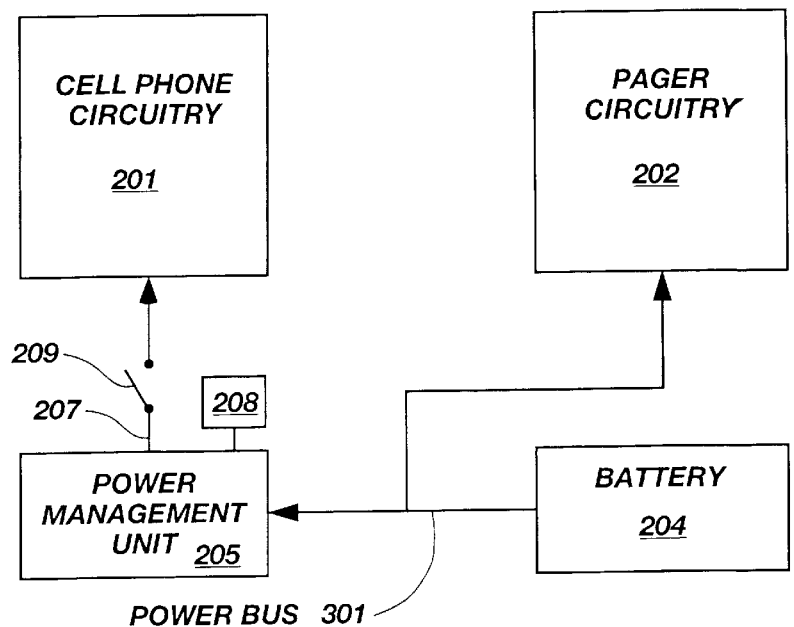
FIG. 3 is a block schematic diagram of a second embodiment portable combination communication device incorporating the invention.

Referring now to FIG. 3, a second embodiment of the combination communication system has no circuitry that is shared by cellular telephone and pager functions. Consequently, only the dedicated pager circuitry 202 and the power management unit 205 are powered directly by the battery 204 via power bus 301. Save for the lack of shared circuitry 203, the combination communication system of FIG. 3 is identical in all other respects to the system depicted in FIG. 2.

Figure 4:
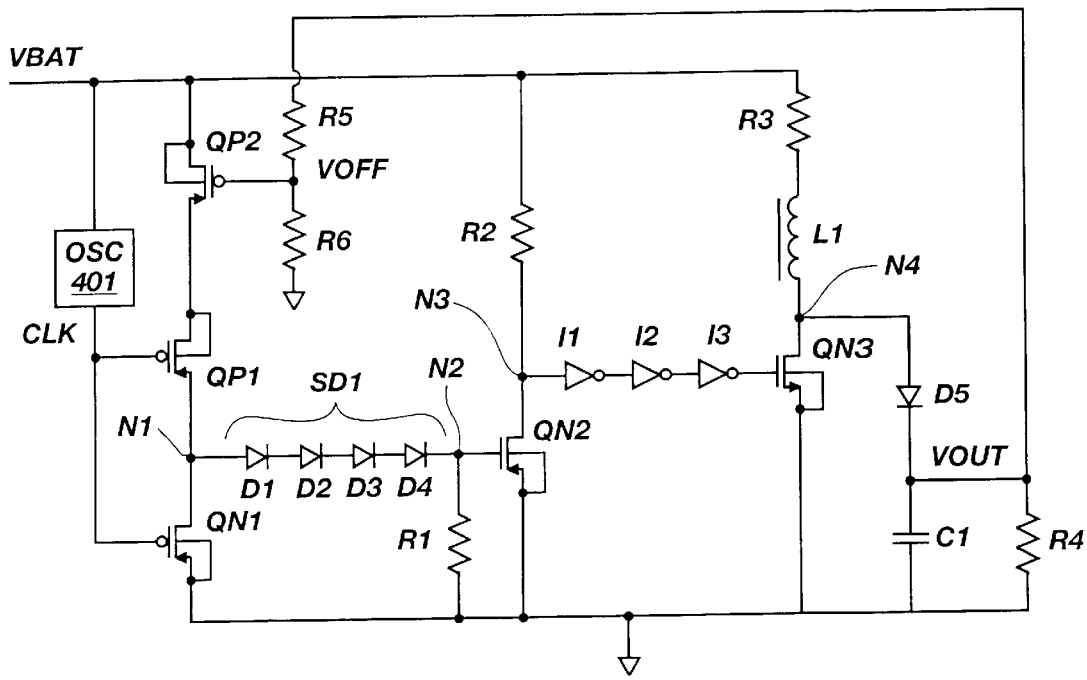
FIG. 4 is an electrical schematic diagram of a first embodiment of the power management unit.

Referring now to FIG. 4, an electrical schematic is depicted for a first embodiment of the power management unit 205 of FIGS. 2 and 3. The circuit is a headroom-limited flyback power supply. An oscillator 401, powered by battery voltage VBAT, produces a clock signal CLK that is input to an inverter constructed from field-effect transistors (FETs) QP1 and QN1. When clock signal CLK is low, transistor QP1 will be switched "on" and transistor QN1 will be switched "off, with node N1 being at battery voltage VBAT. A series-coupled diode chain SD1, constructed from diodes D1, D2, D3 and D4, sets the headroom limit by dropping the VBAT value at node N1 by a threshold value through each diode. Thus, if each diode has a threshold voltage value of 0.7 volts, node N2 will be about 2.8 volts below VBAT during the clock signal CLK. If $V_T$ is the threshold of transistor QN2 (also referred to herein as the intermediate FET), as long as the high phase of the inverted clock signal at node N2 is greater than a VT above ground, transistor QN2 will continue to switch to the "on" state whenever signal CLK is low and node N2 is consequently high. Conversely, when battery voltage VBAT has dropped to a level such that the high value of the inverted clock signal at node N2 is less than a $V_T$ above ground, transistor QN2 will no longer switch with the clock signal CLK. The resistance value of resistor R1 is chosen to provide just enough of a current path to ground so that node N2 will discharge sufficiently during the high phase of signal CLK to switch transistor QN2 to its "off" state. Resistor R2 prevents unnecessary current drain through transistor QN2. The string of inverters I1, I2 and I3 acts as a buffer to increase the strength of the signal at node N3. The output of inverter I3 is coupled to the gate of transistor QN3 (also referred to herein as the final FET). By increasing the strength of the signal at node N3, the switching between "on" and "off" states of transistor QN3 is greatly improved. Without rapid switching, a large portion of the energy intermittently stored in flyback inductor LI would be shunted to ground rather than to the output at node N4. Transistor QN3 provides intermittent current flow through flyback inductor L1 as long as sufficient headroom between the high inverted clock signal on node N2 and battery voltage VBAT exists. The resistance value of resistor R3 determines the voltage of a pulsating output at node N4. This pulsating output at node N4 is rectified by diode D5 and filtered by capacitor C1 to provide a substantially steady final output voltage VOUT. Resistor R4 represents the load imposed by the cellular phone circuitry 201 of either FIG. 1 or FIG. 2. An optional P-channel transistor QP2 disables the flyback function when the final output voltage VOUT exceeds a set value. Signal voltage VOFF, which represents the set value of VOUT, is determined by the resistor values of the voltage divider formed by resistors R5 and R6. By bringing the gate of QP2 high when the set value of VOUT is reached and thereby cutting off current flow through transistors QP1 and QN1, unnecessary power loss to ground through resistor R3, inductor L1 and transistor QN3 is prevented. This is a particularly significant feature when the flyback voltage produced by intermittent current flow inductor L1 is significantly higher than the desired voltage at VOUT. Alternatively, the values of resistor R3 and inductor L1 can be adjusted so that flyback voltage, when dropped across diode D5, is equal to the desired voltage at VOUT. Thus, even if transistor QN3 continues to switch on and off, power loss will be minimal.

Figure 5:
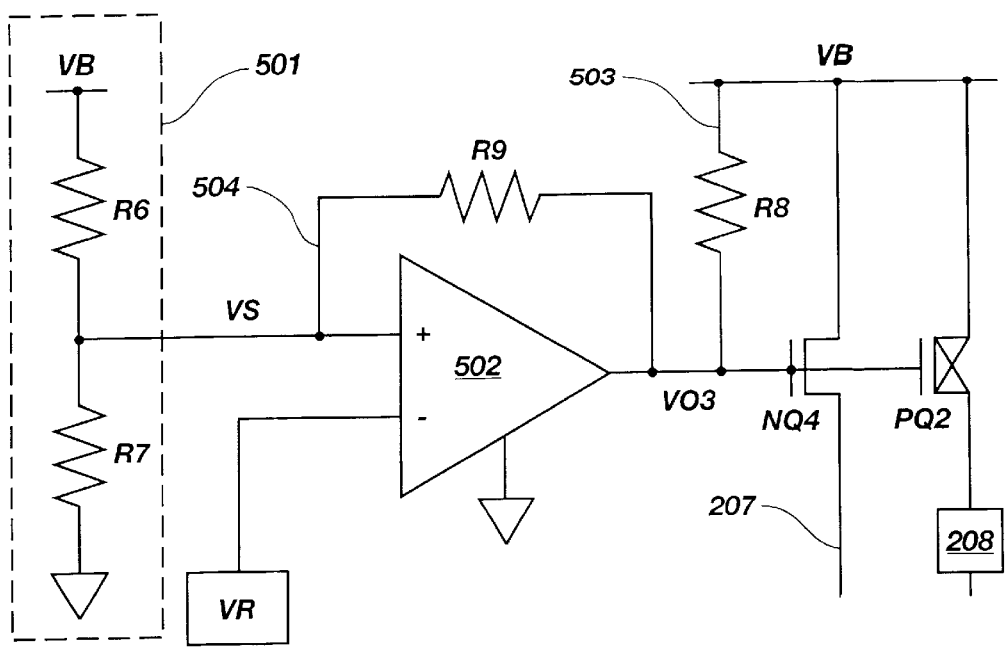
FIG. 5 is an electrical schematic diagram of a second embodiment of the power management unit.

Referring now to FIG. 5, an electrical schematic is depicted for the power management unit 205 of FIGS. 2 and 3. A sample voltage VS that is proportional to the battery voltage VB is provided with a voltage divider 501 constructed from resistors R6 and R7. VS is coupled to the non-inverting input (i.e., the "+" terminal) of a comparator 502. A precision reference voltage VR is coupled to the inverting input (i.e., the "−" terminal) of comparator 502. The values of resistors R6 and R7 are selected so that the sample voltage VS is greater than VR, with the difference between VS and VR corresponding to the voltage range selected for continuous operation of the cellular telephone. That is to say that when VS drops below VR, power to the cellular telephone circuitry must be cut in order to retain a desired quantity of reserve battery power for continued operation of the pager for a desired period. Thus, whenever VS is greater than VR, the output voltage V03 from comparator 502 is high. The high voltage level is provided by VB through current path 503 through resistor R8. Whenever VS is less than VR, output V03 is pulled to ground, overriding the high voltage provided by current path 503. The output from comparator 502 is coupled to the gate of an N-channel field-effect transistor NQ4. When the output from comparator 502 is high, NQ4 conducts, providing power to the cellular telephone circuitry 201. Conversely, when the output from comparator 502 is low, NQ4 is nonconductive, cutting off power to the cellular telephone circuitry 201. In order to prevent oscillations about the set turnoff point (a condition often termed "thrashing"), hysteresis is provided at the output via a Schmitt trigger. The Schmitt trigger function can be provided by positive feedback via an optional feedback path 504, which incorporates resistor R9, or it can be provided by the circuit of FIG. 6 in the absence of feedback path 504.

Figure 6:
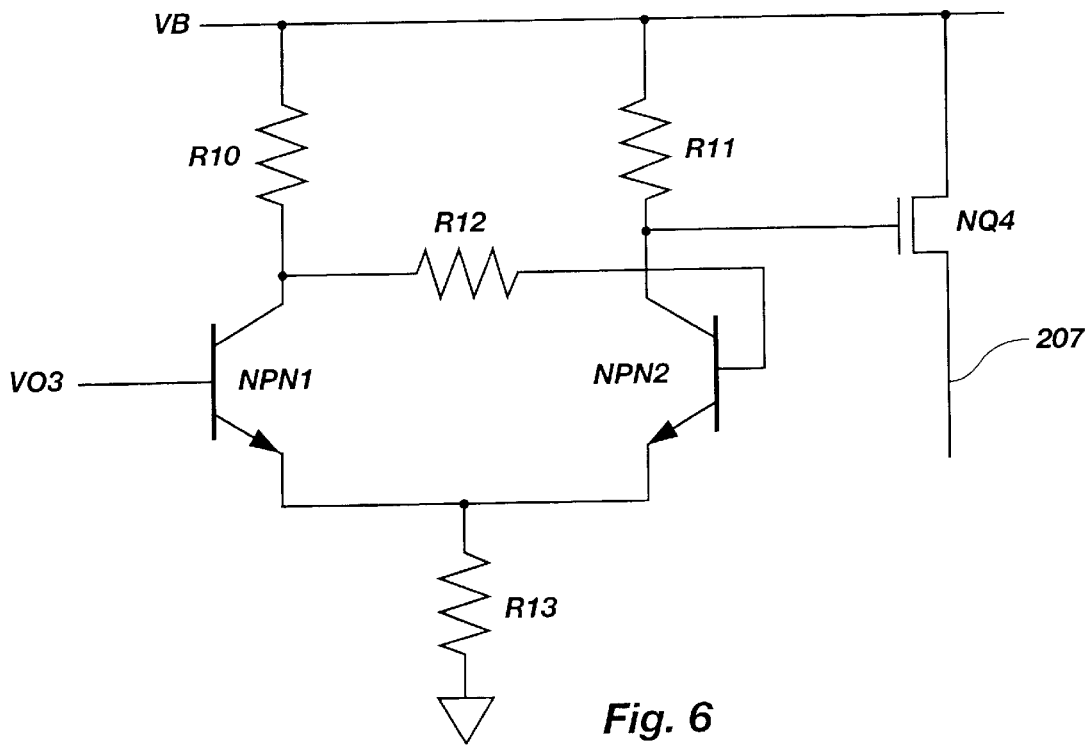
FIG. 6 is a Schmitt trigger circuit constructed from bipolar transistors and resistors.

Referring now to FIG. 6, the Schmitt trigger function is provided in this circuit by a pair of bipolar transistors, NPN1 and NPN2, and a quartet of resistors, R10, R11, R12, and R13. NPN1 and NPN2 share emitter resistor R13. For proper operation of this circuit, it is essential that R10, NPN1's collector resistor, have a larger resistance value than R11, NPN2's collector resistor. Suggested values for R10, R11, R12, and R13 are 1.5 kΩ, 1.0 kΩ, 100Ω and 10 kΩ, respectively. Given such an arrangement, the threshold to turn on NPN1, which is one diode drop above the emitter voltage, rises when NPN1 is turned off, since the emitter current and voltage is higher when NPN2 is conducting. Hysteresis is thereby produced in the trigger threshold.

Figure 7:
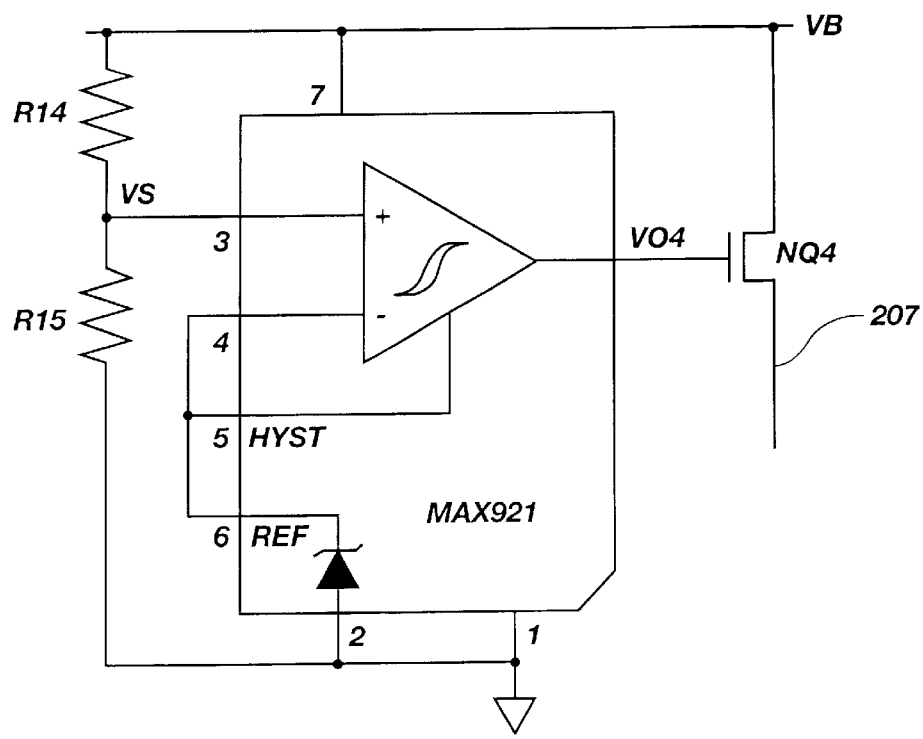
FIG. 7 is an operating circuit for the Maxim 921 comparator, as used in the second embodiment of the power management circuit.

The Maxim 921 integrated circuit (IC) is well adapted for use as a comparator for this comparator application, as it incorporates both hysteresis and a precision bandgap reference voltage in a single IC package. FIG. 7 depicts a circuit employing the Maxim 921 device for the present application. It is essentially an elegant implementation of the circuit of FIG. 5. Resistors R14 and R15 provide the same function as resistors R6 and R7 of FIG. 5. The Maxim 921 IC produces an output V04, which controls FET NQ4. Although the voltage reference symbol at pin 2 is that of a Zener diode, the Maxim 921 comparator actually utilizes a silicon bandgap reference. It should be noted that, in certain cases, a Zener diode might also be utilized to provide a voltage reference for the present invention. However, as Zener diodes are generally noisy and have non-zero temperature coefficients, except when operating in the neighborhood of 6.0 volts, bandgap references are typically preferred as voltage references.

Figure 8:
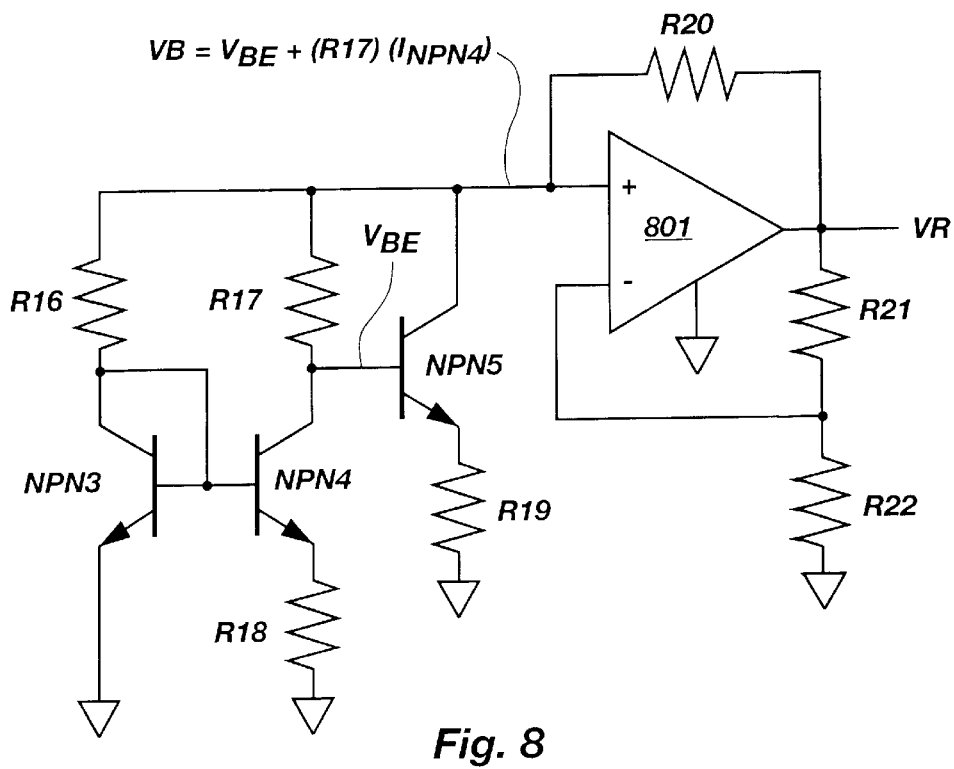
FIG. 8 is a schematic diagram of a first embodiment of a precision bandgap voltage reference circuit.

In a comparator circuit which does not employ the Maxim 921 integrated circuit, it will be necessary to design a precision reference circuit. A precision voltage reference circuit is particularly desirable if the battery 204 is a nickel-cadmium type which has relatively stable voltage output over its charge range, then drops rather precipitously when nearing a fully discharged condition. An example of a classic $V_{BE}$ circuit, which provides a precision reference voltage derived from the bandgap voltage of silicon, is depicted in FIG. 8. The circuit is constructed from a trio of NPN bipolar transistors NPN3, NPN4 and NPN5, and a quintet of resistors, R16, R17, R18, R19, and R20. Resistor R20 couples a reference node 801 to battery voltage VB. The circuit operates by generating a voltage with a positive temperature coefficient that equals the $V_{BE}$'s negative coefficient. When the two voltages are added, the resultant voltage has a zero temperature coefficient. Transistors NPN3 and NPN4; by having dissimilar emitter current densities (typically a ratio of 10:1), provide a current mirror. Resistor R17 sets the amount of positive-coefficient voltage that is added to $V_{BE}$. By choosing the appropriate value of R17, a zero overall temperature coefficient is achieved. It turns out that a zero temperature coefficient results when total voltage $V_{BE}+(R17)(I_{NPN4})$ equals the silicon bandgap voltage (extrapolated to absolute zero), which is about 1.22 volts. This total voltage value is used as the precision reference voltage VR.

If even greater precision is required for the reference voltage VR, other precision bandgap reference circuits are available. For example, on page 30 of the IEEE Journal of Solid-State Circuits, Vol. SC-19, No.6, Dec. 1984, FIG. 6, depicts an improved CMOS bandgap reference voltage circuit which overcomes two basic disadvantages of simple band gap reference circuits. This circuit, as well as its accompanying description, are incorporated herein by reference. The first disadvantage of the simple bandgap reference circuits is that the amplifier offset voltage adds directly to the difference in base-emitter voltages $\Delta V_{BE}$ of the bipolar transistors. Offset voltages of typical CMOS operational amplifiers range between ±15 mV and, when amplified by the resistor ratio gain factor $(1+R_1/R_2)$, lead to a large variation in the reference voltage. This increases the reference voltage trimming requirements for a required precision. The second disadvantage of the simple bandgap reference circuits is that the offset voltage of a CMOS op amp drifts with time and has a temperature coefficient of around 20 $\mu V/°$ C. These variations are amplified and degrade the reference stability and performance.

The improved CMOS bandgap reference voltage circuit, depicted as FIG. 6 of page 30 of the IEEE Journal, employs an area-ratioed stack of three closely-matched bipolar transistors to produce a highly-stable reference voltage which is three times the silicon bandgap voltage. This reduces the effect of the offset by a factor of 3. The bandgap voltage is given by the following formula:

$$V_{BG}=3V_{BE}+(3\Delta V_{BE}+V_{OS})\cdot(1+R_1/R_2)$$

Transistors $M_1$–$M_6$ are matched current sources, each of which forces a current equal to $3\Delta V_{BE} \div R_1/R_2$ into each bipolar transistor. The transistors $M_7$–$M_{11}$ drop the necessary voltage required to match the currents in $M_1$–$M_6$ to within 0.5 percent. The resulting output voltage $V_{BG}$ is 3.8 volts.

Referring now to the block circuit diagram of FIG. 9, depicted is a third embodiment portable communication system. This system includes dedicated cellular telephone circuitry 201, dedicated pager circuitry 202, a first DC power source 901 which powers the dedicated cellular telephone circuitry 201, and a second DC power source 902 which powers the dedicated pager circuitry 202. As the power requirements of the dedicated pager circuitry are minimal, a single alkaline cell can power a pager for up to several weeks. Of course, the second DC power source 902 may be either rechargeable or discardable after the charge therein is exhausted. The first DC power source 901 is preferably rechargeable because of the high power consumption requirements of the powered device (i.e., the cellular telephone in this particular example of a combination portable communication device). No power management unit, such as the one employed for the systems of FIGS. 2 and 3 is required, as the pager DC power source 902 is independent from that of the cellular telephone DC power source 901.

Referring now to FIG. 10, the basic steps are listed for the invention characterized as a method. For ensuring that, in an electronic device having at least two communication devices packaged as a single unit, sufficient power is provided for extended operation of the communication device having the lowest continuous power consumption requirements, are the following steps:

providing a communication system incorporating at least first and second communication devices in a single package, the first device having a higher continuous power consumption rate than the second device;

providing an exhaustible supply of direct-current power within the package for the system, said exhaustible supply having a finite amount of available power;

dedicating a selected portion of the direct-current power within the package to the second device so that it may remain serviceable for a desired period, in spite of the higher power consumption requirements of the first communication device.

A first embodiment of the method employs a separate DC power source for the second communication device, as heretofore described. A second embodiment of the method employs a single DC power source in combination with a power management unit, also as heretofore described.

It should be evident that the heretofore described apparatuses and method are capable of providing a portable communication system incorporating at least first and second communication devices, with the first device having a higher continuous power consumption rate than the second device, wherein functionality of the second communication device is maintained for at least a selected period of time, in spite of the higher continuous power consumption rate of the first communication device.

Although only several embodiments of the portable combination communication and the corresponding method are described, it will be obvious to those having ordinary skill in the art that changes and modifications may be made thereto without departing from the scope and the spirit of the process and products manufactured using the process as hereinafter claimed.

What is claimed is:

1. A communication package comprising:

a first battery-powered communication device and a second battery-powered communication device, said first battery-powered communication device having power consumption requirements which are at least an order of magnitude greater than those of said second battery-powered communication device;

a battery power source for supplying a flow of electricity for powering both said first battery-powered communication device and said second battery-powered communication device, said battery power source having first and second output terminals, said first output terminal having a potential that is positive with respect to a potential of said second output terminal, said battery power source including a first battery and a second battery; and a power management unit for providing an uninterrupted flow of said flow of electricity to said second battery-powered communication device for a predetermined period although said battery power source has insufficient capacity for providing an uninterrupted flow of said flow of electricity to said first battery-powered communication device for said predetermined period, said power management unit comprising:

an oscillator having a clock signal;

an inverter including a P-channel FET having a gate coupled to said clock signal and a channel coupling said first output terminal to an output node, and an N-channel FET having a gate coupled to said clock signal and a channel coupling said second output terminal to said output node;

a current-limiting resistor;

an intermediate FET having a gate and a channel connected in series with said current-limiting resistor coupling said first output terminal to said second output terminal;

a plurality of series-coupled diodes coupling said output node to said gate of said intermediate FET; and a flyback inductor for current from a storage device to intermittently flow through, said intermittent flow being controlled by said intermediate FET to provide a pulsating flyback voltage after rectification and filtering thereof gives an output voltage for powering said first battery-powered communication device.

2. The communication package of claim 1, wherein said first battery and said second battery comprise a first battery and a second battery which together supply said flow of electricity, said first battery providing power to said first battery-powered communication device, and said second battery providing power to said second battery-powered communication device.

3. The communication package of claim 2, wherein said second battery comprises an electrochemical cell and said first battery comprises a plurality of electrochemical cells.

4. The communication package of claim 1, wherein said power management unit includes:
   a reference voltage;
   a measured voltage representative of a charge level of said battery power source; and
   a switch for cutting a flow of electricity from said storage device to said first battery-powered communication device when said measured voltage drops below a predetermined level that corresponds to a minimum battery charge level required for continued operation of said second battery-powered communication device for a desired period of time.

5. The communication package of claim 4, wherein a silicon bandgap circuit produces said reference voltage.

6. The communication package of claim 4, wherein a voltage divider circuit produces said measured voltage.

7. The communication package of claim 4, which further comprises a comparator including:
   an output;
   a first input coupled to said reference voltage; and
   a second input coupled to said measured voltage.

8. The communication package of claim 7, wherein said switch is a transistor controlled by said comparator output.

9. The communication package of claim 4, wherein said second battery-powered communication device is a pager, and said first battery-powered communication device is a wireless telephone.

10. The communication package of claim 1, which further comprises:
    an intermediate node interposed between said current-limiting resistor and said intermediate FET;
    a final FET having a gate coupled to said intermediate node through at least one buffer, said final FET and said flyback inductor providing a serial current path between said first and said second output terminals; and
    a final node within said serial current path interposed between said flyback inductor and said final FET, said intermittent flow of said current taken from said final node within said serial current path.

11. The communication package of claim 10, wherein said intermediate FET and said final FET are both N-channel devices.

12. The communication package of claim 11, further comprising:
    an adjustment resistor interposed in said serial current path having a resistance value setting said output voltage.

13. The communication package of claim 1, further comprising:
    a flyback shut-off transistor controlled by said output voltage for disabling said inverter when said output voltage reaches a preset level.

14. The communication package of claim 13, further comprising:
    a voltage divider which adjusts said preset level.

15. A plurality of communication devices in a portable package having a single battery power source for powering said plurality of communication devices and having a power management unit, said single battery power source including a first battery and a second battery, said power management unit comprising:
    an oscillator producing a clock signal, said oscillator powered by one of said first battery and said second battery;
    an inverter including a P-channel FET having a gate coupled to said clock signal and a channel coupling a first output terminal of said single battery power source to an output node, and an N-channel FET having a gate coupled to said clock signal and a channel coupling a second output terminal of said single battery power source to said output node;
    a current-limiting resistor for limiting current supplied by one of said first battery and said second battery;
    an intermediate FET having a gate and a channel in series with said current-limiting resistor coupling said first output terminal to said second output terminal;
    a plurality of series-coupled diodes coupling said output node to said gate of said intermediate FET;
    a flyback inductor through which current from a storage device intermittently flows, being controlled by said intermediate FET for providing intermittent output power subsequent to rectification and filtering, said flyback inductor powering a first of said at least two communication devices;
    an intermediate node interposed between said current-limiting resistor and said intermediate FET;
    a final FET having a gate coupled to said intermediate node through at least one buffer, said final FET and said flyback inductor providing a serial current path between said first and said second output terminals;
    an adjustment resistor interposed in said serial current path; and
    a final node within said serial current path, said final node interposed between said flyback inductor and said final FET, said intermittent output power being taken from said final node.

16. The plurality of communication devices of claim 15, wherein said intermediate FET and said final FET are both N-channel devices.

17. The plurality of communication devices of claim 15, wherein said power management unit further comprises:
    an adjustment resistor interposed in said serial current path having a resistance value setting an output voltage.

18. A wireless communication device and a pager device packaged in a portable package having a single battery power source for providing power for operating both said wireless communication device and said pager device and having a power management unit, said single battery power source including a first battery and a second battery, said power management unit comprising:
    an oscillator producing a clock signal, said oscillator powered by one of said first battery and said second battery;
    an inverter having both a P-channel FET having a gate coupled to said clock signal and a channel coupling a first output terminal of said single battery power source to an output node and an N-channel FET having a gate coupled to said clock signal and a channel coupling a second output terminal of said single battery power source to said output node;

a current-limiting resistor;

an intermediate N-channel FET having a gate and a channel connected in series with said current-limiting resistor coupling said first output terminal to said second output terminal;

a plurality of series-coupled diodes coupling said output node to said gate of said intermediate N-channel FET; and a flyback inductor through which current from a storage device intermittently flows being controlled by said intermediate N-channel FET to provide intermittent output power subsequent to rectification and filtering thereof, said flyback inductor powering said wireless communication device.

19. The wireless communication device and a pager device packaged in a portable package of claim 18, wherein said power management unit further comprises:

an intermediate node interposed between said current-limiting resistor and said intermediate N-channel FET; and a final FET having a gate coupled to said intermediate node through at least one buffer, said final FET and said flyback inductor providing a serial current path between said first and said second output terminals, said intermittent output power being taken from a final node within said serial current path, said final node interposed between said flyback inductor and said final FET.

20. The wireless communication device and a pager device packaged in a portable package of claim 19, wherein said final FET comprises an N-channel device.

* * * * *